United States Patent
Zhang et al.

(10) Patent No.: US 11,512,703 B2
(45) Date of Patent: Nov. 29, 2022

(54) FAN FOR ADJUSTING AIR FLOW

(71) Applicants: GD MIDEA ENVIRONMENT APPLIANCES MFG CO., LTD., Zhongshan (CN); MIDEA GROUP CO., LTD., Foshan (CN)

(72) Inventors: Huanming Zhang, Zhongshan (CN); Shiqiang Cui, Zhongshan (CN); Rong Yi, Zhongshan (CN); Xusheng Zhang, Zhongshan (CN); Yu Fang, Zhongshan (CN); Ruixiang Kang, Zhongshan (CN); Li Liang, Zhongshan (CN)

(*) Notice: Subject to any disclaimer, the term of this patent is extended or adjusted under 35 U.S.C. 154(b) by 16 days.

(21) Appl. No.: 17/058,608

(22) PCT Filed: Dec. 26, 2018

(86) PCT No.: PCT/CN2018/123808
§ 371 (c)(1),
(2) Date: Nov. 24, 2020

(87) PCT Pub. No.: WO2020/010807
PCT Pub. Date: Jan. 16, 2020

(65) Prior Publication Data
US 2021/0215160 A1 Jul. 15, 2021

(30) Foreign Application Priority Data

Jul. 9, 2018 (CN) .......................... 201810749400.0
Jul. 9, 2018 (CN) .......................... 201821084768.1

(51) Int. Cl.
*F04D 19/00* (2006.01)
*F04D 25/08* (2006.01)
(Continued)

(52) U.S. Cl.
CPC ........... *F04D 19/007* (2013.01); *F04D 25/08* (2013.01); *F04D 25/166* (2013.01);
(Continued)

(58) Field of Classification Search
CPC ........ F04D 29/185; F04D 25/06; F04D 25/08; F04D 25/12; F04D 25/166; F04D 29/325;
(Continued)

(56) References Cited

U.S. PATENT DOCUMENTS

| | | | | |
|---|---|---|---|---|
| 4,309,595 A | * | 1/1982 | Long | A45D 20/10 338/305 |
| 6,445,148 B2 | * | 9/2002 | Huang | H02P 1/54 310/62 |
| 6,652,230 B1 | * | 11/2003 | Huang | F01D 1/02 415/193 |

(Continued)

FOREIGN PATENT DOCUMENTS

| | | |
|---|---|---|
| CN | 104235065 A | 12/2014 |
| CN | 104776043 A | 7/2015 |

(Continued)

OTHER PUBLICATIONS

OA of Japanese Patent Application No. 2020-568786.

*Primary Examiner* — Thomas Fink
(74) *Attorney, Agent, or Firm* — Kilpatrick Townsend & Stockton, LLP (57) ABSTRACT

Disclosed is a fan. The fan includes a support; a first motor installed on the support, the first motor having a first rotation shaft; a first blade installed on the first rotation shaft; a second motor installed on the support, the second motor having a second rotation shaft and being coaxial with the first motor; a second blade installed on the second rotation shaft, a tilt direction of the second blade being opposite to a tilt direction of the first blade; and an electric control board electrically connected to the first motor and the second motor and configured to control a relative rotation of the first motor and the second motor.

7 Claims, 4 Drawing Sheets

(51) Int. Cl.
*F04D 25/16* (2006.01)
*F04D 27/00* (2006.01)
*F04D 29/38* (2006.01)
*F04D 25/06* (2006.01)
*F04D 29/32* (2006.01)

(52) U.S. Cl.
CPC ........... *F04D 27/004* (2013.01); *F04D 29/38* (2013.01); *F04D 25/06* (2013.01); *F04D 29/327* (2013.01)

(58) Field of Classification Search
CPC ................... F04D 29/327; F04D 29/38; F04D 19/002–007; F04D 19/02–028
See application file for complete search history.

(56) References Cited

U.S. PATENT DOCUMENTS

| | | | | |
|---|---|---|---|---|
| 2004/0213687 | A1* | 10/2004 | Cheng | F04D 25/166 417/423.5 |
| 2006/0276122 | A1* | 12/2006 | Cheng | F24F 7/007 454/254 |
| 2010/0054931 | A1* | 3/2010 | Yoshida | F04D 19/007 415/199.5 |
| 2011/0174011 | A1* | 7/2011 | Kim | F24F 1/40 62/426 |
| 2012/0222843 | A1* | 9/2012 | Mitchell | F04D 19/002 165/104.34 |
| 2019/0345947 | A1* | 11/2019 | Yao | F04D 25/08 |
| 2020/0056618 | A1* | 2/2020 | Decker | F04D 19/007 |

FOREIGN PATENT DOCUMENTS

| | | |
|---|---|---|
| CN | 106968973 A | 7/2017 |
| CN | 206309618 U | 7/2017 |
| CN | 107218237 A | 9/2017 |
| CN | 207229425 U | 4/2018 |
| CN | 108869357 A | 11/2018 |
| JP | 2001050191 A | 2/2001 |
| JP | 2014196713 A | 10/2014 |

* cited by examiner

FAN FOR ADJUSTING AIR FLOW

CROSS-REFERENCES TO RELATED APPLICATIONS

The present disclosure is a national phase application of International Application No. PCT/CN2018/123808, filed on Dec. 26, 2018, which claims priority to Chinese Application Nos. 201810749400.0 and 201821084768.1, both filed on Jul. 9, 2018, the entire disclosure of which are incorporated herein by reference.

FIELD

The present disclosure relates to the technical field of household appliances, in particular to a fan.

BACKGROUND

Electric fans can be divided into ceiling fans, table fans, floor fans, wall fans, ventilation fans, air-conditioning fans, etc. according to different functions and forms, and can be divided into axial fans, tubular fans, centrifugal fans and cross flow fans according to different air inlet and outlet ways. Household table fans and floor fans are mostly axial fans. Generally, the air volume of household table fans and floor fans is small, and the air volume is relatively large in high gear. However, when the air volume is large in high gear, there will generate a loud noise, and the use environment is usually indoor, the impact of noise will be greater. Besides, the axial fan has a single air outlet mode, which cannot be applied to the situation where the air supply distance is far and the air supply distance is close. For example, when the living room area is large, the air supply distance of ordinary household floor fans is difficult to blow from one side of the living room to the other side of the living room, especially when the air is swinging, the air supply distance is closer. When the bedroom area is small and it is necessary to supply air for the elderly or infants, it is easy to feel the speed due to the too close distance, which is not conducive to the health of the elderly or infants.

SUMMARY

Embodiments of the present disclosure provides a fan, which aims to solve the problem that the current electric fan has a single air supply mode, and the air volume and air supply distance cannot be specifically adjusted according to actual needs.

Embodiments of the present disclosure provides a fan, including: a support; a first motor installed on the support, the first motor having a first rotation shaft; a first blade installed on the first rotation shaft; a second motor installed on the support, the second motor having a second rotation shaft and being coaxial with the first motor; a second blade installed on the second rotation shaft, a tilt direction of the second blade being opposite to a tilt direction of the first blade; and an electric control board electrically connected to the first motor and the second motor and configured to control a relative rotation of the first motor and the second motor.

In an embodiment, the electronic control board includes a speed ratio adjustment device, a speed adjustment device, and a steering adjustment device; the speed ratio adjustment device is configured to adjust and fix a speed ratio of the first motor and the second motor; the speed adjustment device is configured to synchronously adjust speeds of the first motor and the second motor; and the steering adjustment device is configured to switch rotation directions of the first motor and the second motor.

In an embodiment, the steering adjustment device includes a protection switch to cut off the steering adjustment device when the first motor and the second motor are working.

In an embodiment, the electronic control board further includes a gear adjustment device, and the gear adjustment device includes an editor for editing a gear, a memory, preset gear selection keys and at least one custom gear selection key.

In an embodiment, a number of the first blade is m, and a number of the second blade is $n_2$; a torsion angle of the first blade is $\theta_1$, and a torsion angle of the second blade is $\theta_2$; and a product of a ratio of the number of the first blade to the number of the second blade and a ratio of the torsion angle of the first blade to the torsion angle of the second blade is a first difference coefficient, the first difference coefficient $K_1$ is equal to $$\frac{n_1 \cdot \theta_1}{n_2 \cdot \theta_2},$$

and the first difference coefficient $K_1$ is no less than 0.7 and no greater than 1.2.

In an embodiment, the first difference coefficient $K_1$ is no less than 0.9 and no greater than 1.1.

In an embodiment, a length of the first blade is $l_1$, an area of the first blade is $S_1$, a length of the second blade is $l_2$, and an area of the second blade is $S_2$; a product of a ratio of the area of the first blade to the length of the first blade and a ratio of the area of the second blade to the length of the second blade is a second difference coefficient, the second difference coefficient $K_2$ is equal to $$\frac{l_2 S_1}{l_1 S_2},$$

and the second difference coefficient $K_2$ is no less than 0.8 and no greater than 1.2.

In an embodiment, a ratio of $l_1$ to $l_2$ is no less than 0.8 and no greater than 1.3.

In an embodiment, a distance between the first blade and the second blade is L and a ratio of $l_1$ to L is no less than 1.5 and no greater than 3.

In an embodiment, the ratio of $l_1$ to $l_2$ is no less than 0.9 and no greater than 1.1, and the ratio of $l_1$ to L is no less than 2 and no greater than 2.5.

In an embodiment, the fan further includes a third blade installed on the first rotation shaft.

In an embodiment, the third blade is provided outside the first blade, and a length of the third blade is less than a length of the first blade.

In an embodiment, the fan further includes a fourth blade installed on the second rotation shaft.

In an embodiment, the fourth blade is provided between the first blade and the second blade, and a length of the fourth blade is less than a length of the second blade.

In technical solutions of the present disclosure, the first motor and second motor drive the rotation of the first blade and the second blade, and a central control system adjusts the speed ratio of the first motor and the second motor, and the fan of the present disclosure has the ability to quickly disperse the airflow, and the ability to emit the air at a long distance, and can quickly adjust between different air outlet modes according to the needs.

BRIEF DESCRIPTION OF THE DRAWINGS

In order to more clearly illustrate the embodiments of the present disclosure, drawings used in the embodiments will be briefly described below.

DESCRIPTION OF REFERENCE SIGNS

| reference sign | name |
| --- | --- |
| 100 | support |
| 200 | first motor |
| 201 | first blade |
| 202 | first rotation shaft |
| 300 | second motor |
| 301 | second blade |
| 302 | second rotation shaft |
| 400 | third blade |
| 500 | fourth blade |

Detailed Description of the Disclosure

Embodiments of the present disclosure will be described in more detail below with reference to the accompanying drawings.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated feature. Therefore, the feature associated with "first" or "second" can expressly or impliedly include at least one such feature. In addition, the solutions between the various embodiments can be combined with each other. When the combination of solutions is contradictory or cannot be achieved, it should be considered that such a combination of solutions does not exist, nor does it fall within the scope of the present disclosure.

Axial fans such as household floor fans and table fans use a motor to drive an inclined blades fixed on the motor shaft to rotate, driving the air towards the axis of the motor. This kind of fan has a simple structure and a direct air outlet way, which is the most common application. However, the air directly pushed by the blades of this fan not only has momentum along the axial direction, but also has momentum perpendicular to a rotation axis caused by the friction between the blade and the air. The momentum of the airflow perpendicular to the rotation axis will spread the airflow. After the airflow disperses, a cross-section of the airflow bundle increases, the resistance when moving in the axial direction increases sharply, resulting in a shorter effective air supply distance in the axial direction. Especially when the fan is shaking and swaying the air, the effective air supply distance in the axial direction is shorter than the air supply distance in a single direction.

Taking the "Midea FS40-12DR" floor fan as an object to test the speed for the air volume test apparatus, the maximum air outlet speed of the Midea FS40-12DR is about 4 m/s, which is basically the same as other floor fans. The fan is turned on and adjusted to the highest gear, the air volume table is placed at different distances in front of the axis of the fan to detect the speed. The data is as follows:

| | distance (m) | | | | |
| --- | --- | --- | --- | --- | --- |
| | 1 | 2 | 3 | 4 | 5 |
| speed (m/s) | 3.85 | 2.47 | 1.65 | 0.75 | 0.6 |

From the experimental data, the attenuation of the speed of the fan is a non-linear attenuation, the higher the speed, the faster the attenuation. The speed attenuates to 1.65 m/s at 3 m, while the human body needs the speed to be around 1.6 m/s to feel the wind.

From the above test data, it can be concluded that the effective air supply distance of an ordinary floor fan is about 3 m, which is consistent with the experience in daily use.

Generally, an effective air supply distance of 3 m can meet the needs of most application scenarios, but when an axial fan such as a floor fan is turned on to a high gear, the generated noise is louder. Also, "Midea FS40-12DR" is used to conduct a gear and noise comparison test (the higher the gear, the higher the speed). "Midea FS40-12DR" has better mechanical noise control among similar products, and there is almost no noise caused by mechanical vibration or friction of components during operation. Therefore, the detected noise can be considered to be all from the noise generated when the blade blows the airflow. FS40-12DR has three gears, and the noise level corresponding to each gear is detected at a distance of two meters from the fan. The data is as follows:

| | gear | | |
| --- | --- | --- | --- |
| | 1 | 2 | 3 |
| noise (db) | 36.3 | 43.2 | 53.8 |

When the noise exceeds 50 decibels during the day and 45 decibels at night, it will interfere with normal sleep and rest. According to the acoustic environment quality standards, category 0 acoustic environment area (referring to an area that require quietness such as rehabilitation area) requires no more than 50 decibels during the day and no more than 40 decibels at night. Category 1 acoustic environment area (referring to an area that need to keep quiet with residential, medical and health, cultural education, scientific research and design, administrative office as the main function) requires no more than 55 decibels during the day and no more than 45 decibels at night.

As can be seen, when a conventional floor fan is used at night, the noise generated at the maximum gear will significantly affect sleep and rest. Even in the daytime, the noise generated at the maximum gear does not meet the requirements of the category 0 acoustic environment area.

Therefore, the conventional floor fan with a single motor and a single blade cannot ensure sufficient effective air supply distance under the premise of maintaining sufficient silence. At the same time, the conventional floor fan cannot meet the air supply requirements of larger spaces, such as larger living rooms.

Besides, in some application scenarios, such as supplying air for infants and young children or for the elderly in a small bedroom, what is needed is no longer a large effective air supply distance, but a soft air that disperses the airflow as soon as possible to prevent the large speed from blowing directly on the body of infants and young people or the elderly. At present, people usually turn the fan towards the wall, and use the recoil effect of the wall to the airflow to make the airflow quickly disperse, instead of directly adjusting the fan.

For this reason, the present disclosure provides a fan. The fan proposed in the present disclosure uses two motors to separately control the two blades to rotate in opposite directions, and inclination directions of the two blades are opposite. Therefore, when the two blades rotate in opposite directions, the air outlet directions are the same.

Figure 1:
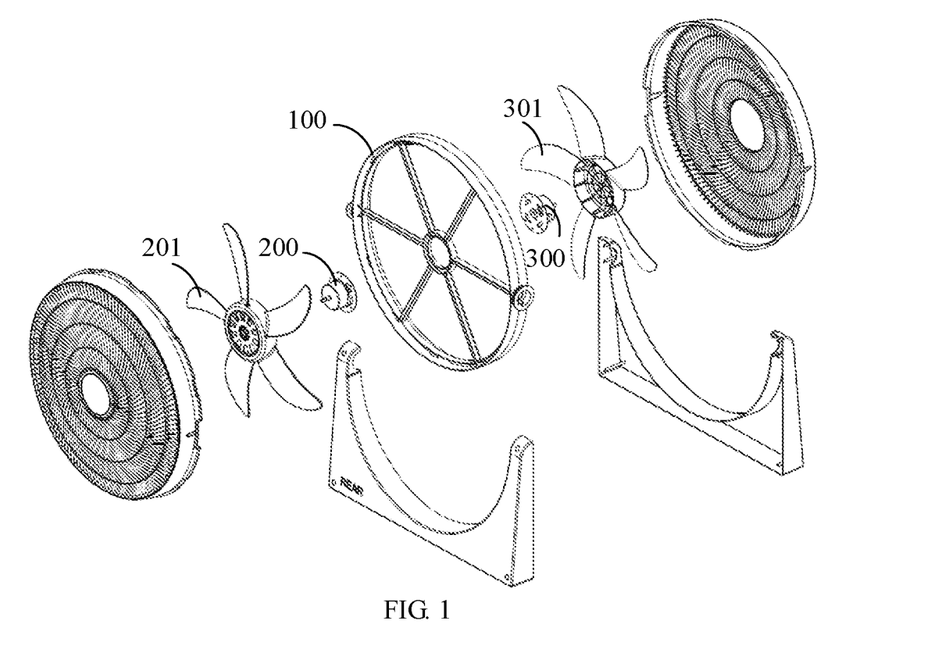
FIG. 1 is an exploded schematic structural diagram of a fan according to the present disclosure.
Figure 2:
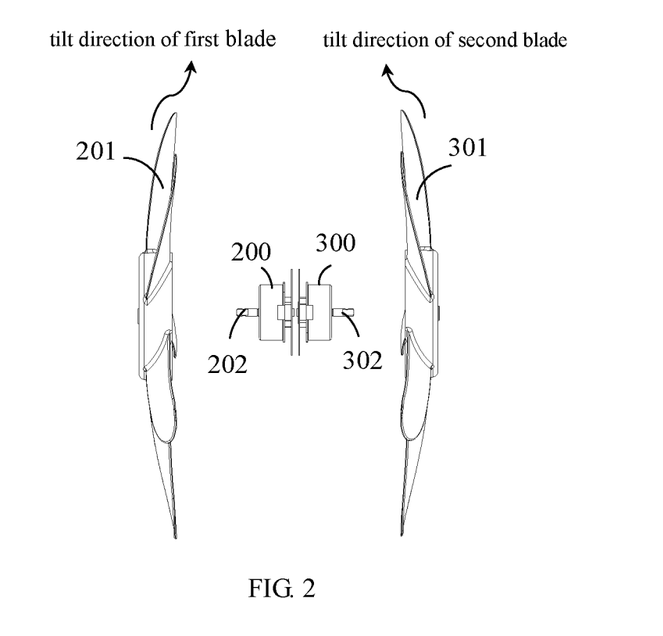
FIG. 2 is a schematic structural side view of a blade and a motor of the fan according to the present disclosure.
Figure 3:
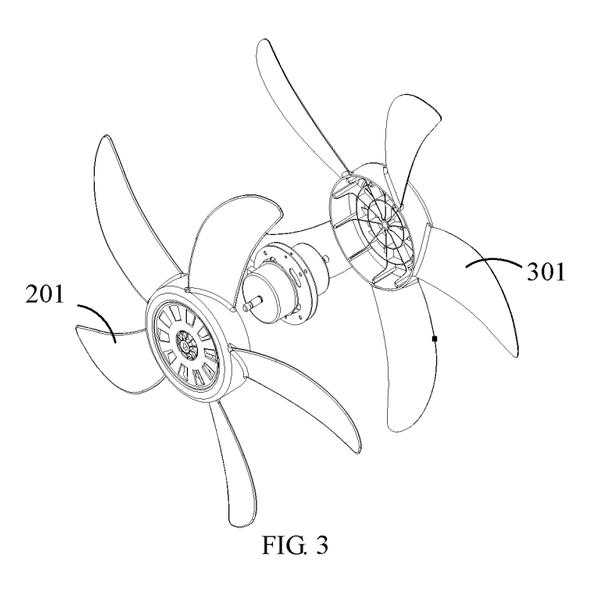
FIG. 3 is a schematic structural diagram of the blade and the motor of the fan according to the present disclosure.

In an embodiment of the present disclosure, as shown in FIG. 1 to FIG. 3, the fan includes a support 100, a first motor 200, a first blade 201, a second motor 300, a second blade 301 and an electric control board. The first motor 200 is installed on the support 100, and the first motor 200 has a first rotation shaft 202. The first blade 201 is installed on the first rotation shaft 202. The second motor 300 is installed on the support 100, and the second motor 300 has a second rotation shaft 302 and is coaxial with the first motor 200. The second blade 301 is installed on the second rotation shaft 302, and a tilt direction of the second blade 301 is opposite to a tilt direction of the first blade 201. The electric control board is connected to the first motor 200 and the second motor 300 and configured to control a relative rotation of the first motor 200 and the second motor 300.

The first motor 200 drives the first rotation shaft 202 to rotate to drive the first blade 201 to rotate; similarly, the second motor 300 drives the second rotation shaft 302 to rotate to drive the second blade 301 to rotate. The first motor 200 and the second motor 300 are respectively electrically connected to the electric control board. The electric control board separately controls the rotation direction and rotation speed of the first motor 200 and the second motor 300, so that the rotation directions of the first motor 200 and the second motor 300 are kept opposite.

Dual motors with counter-rotating and air out in the same direction can make the air be driven by the axial superposition and the radial mutually offset driving effect, reduce the disturbance of the air flow in the axial movement, and make the air flow move forward smoothly. When the rotation speed of the two blades is not much different, compared with the air from a single blade, the gathering effect of the airflow is obvious, and it can be transmitted to a longer distance. The difference in the speed of the two blades will lead to the different air outlet effect of the fan. The influence of the speed ratio of the first blade 201 and the second blade 301 on the air output and effective air supply distance of the fan will be described in detail below.

The electronic control board includes a speed ratio adjustment device, a speed adjustment device, and a steering adjustment device. The speed ratio adjustment device is configured to adjust and fix a speed ratio of the first motor 200 and the second motor 300. The speed adjustment device is configured to synchronously adjust speeds of the first motor 200 and the second motor 300. The steering adjustment device is configured to switch rotation directions of the first motor 200 and the second motor 300.

The steering adjustment device has two adjustment modes, one is a forward rotation mode and the other is a reverse rotation mode. In the forward rotation mode, the fan discharges air in a forward direction, and in a reverse rotation mode, the fan discharges air in the reverse direction. The steering adjustment device includes an adjustment switch and a protection switch. The protection switch is configured to cut off the steering adjustment device when the fan is working, to prevent the triggering of the steering adjustment switch, causing the first motor 200 and the second motor 300 to reverse and causing damage. The steering adjustment switch is configured to switch the power supply mode of the first motor 200 and the second motor 300 when the fan stops working, to control the fan to discharge air in the forward or reverse direction. The protection switch is a normally closed switch. When the fan is working, the protection switch is opened to cut off the power supply of the steering adjustment device; when the fan is powered on and not working, the protection switch is closed, and the steering adjustment device can work normally.

For a conventional fan with a single motor and a single blade, when an output power of the motor is constant, factors that affect the fan's air output capacity (mainly including air output and effective air supply distance) include a number of blades, an area of a single blade, a torsion angle of the blade (the angle between a width direction of the blade and a direction of linear velocity of the blade when the blade is rotating), a length of the blade, a width of the blade and a speed of the blade etc. The contribution of these factors to the fan's air output capacity is not simply superimposed, but will have a certain impact on each other. For example, when the blade is equivalent to a rectangle, the area of a single blade is the product of the length and the width of the blade. When the area of a single blade is constant, the greater the length of the blade, the greater the total air output of the fan. However, the relationship between the length of the blade and the effective air supply distance of the fan is not consistent. If the length of the blade is too large or too small, the effective air supply distance of the fan will be reduced.

For the fan proposed in the present disclosure, when the total output power of the motor is constant, in addition to the above factors affecting the air output capacity of a single motor and a single blade, the factors that affect the fan's air output capacity further include a relationship between the aforementioned factors of the first blade 201 and the second blade 301 and the distance between the first blade 201 and the second blade 301. For example, when other factors are the same, the speed ratio of the first blade 201 and the second blade 301 will affect the effective air supply distance and the total air output of the fan.

Taking the fan blowing out to the side of the first blade 201 as an example, the speed of the first blade 201 is $\omega_1$, and the speed of the second blade 301 is $\omega_2$. The total output power of the first motor 200 and the second motor 300 remains constant. The first blade 201 and the second blade 301 with only different twisting directions are used to conduct a comparative test of the effective air supply distance and the total air output of the fan under different speed ratios. Part of the data is as follows:

| $\dfrac{\omega_1}{\omega_2}$ | 0.7 | 0.8 | 0.9 | 1.0 | 1.1 | 1.2 | 1.3 |
|---|---|---|---|---|---|---|---|
| air output (m³/h) | 720 | 893 | 1003 | 1002 | 997 | 921 | 910 |
| effective air supply distance (m) | 4 | 6.5 | 8.5 | 8.5 | 7 | 6.5 | 6 |

It can be seen from the above test data that when the speed ratio of the first blade 201 and the second blade 301

$$\frac{\omega_1}{\omega_2}$$

is no less than 0.9 and no greater than 1.1, the air output is higher. When the speed ratio of the first blade 201 and the second blade 301

$$\frac{\omega_1}{\omega_2}$$

is no less than 0.9 and no greater than 1.0, the effective air supply distance is longer. Besides, when $$\frac{\omega_1}{\omega_2}$$

is greater than 1.2, the attenuation of air output and effective air supply distance gradually slows down. When $$\frac{\omega_1}{\omega_2}$$

is less than 0.8, the attenuation of the air output and attenuation of the effective air supply distance are both significantly faster, and the attenuation speed of the effective air supply distance is significantly higher than the attenuation speed of the air output. Through further experiments, the data shows that when $$\frac{\omega_1}{\omega_2}$$

is less than 0.55, the attenuation speed of the air output is significantly reduced; and when $$\frac{\omega_1}{\omega_2}$$

is equal to 0.45, the effective air supply distance is the smallest.

When the attenuation speed of the air supply distance is obviously greater than the attenuation speed of the air output, it can be inferred that the air supply cross section will increase significantly, that is, the air flow will diverge significantly. When the air supply needs to be supplied at a long distance, the speed ratio adjustment device can be used to control the speed ratio $$\frac{\omega_1}{\omega_2}$$

between 0.9 and 1 to achieve the maximum distance of effective air supply. When the air needs to be supplied at a short distance and the air flow needs to be dispersed quickly, the speed ratio adjustment device can be used to control the speed ratio $$\frac{\omega_1}{\omega_2}$$

to a small value, for example, between 0.4 and 0.6.

Ordinary fans usually have three preset gears, and the fan of the present disclosure can also have present gears. In one embodiment, the electronic control board in this embodiment includes a gear adjustment device, and the gear adjustment device includes an editor for editing a gear, a memory, preset gear selection keys and at least one custom gear selection key. The fan of the present disclosure can have different air outlet modes. Therefore, the preset gear includes the gear of the air outlet mode in addition to the conventional gear for controlling the speed. For example, the preset gears include a soft wind mode gear and a direct wind mode gear. The preset $$\frac{\omega_1}{\omega_2}$$

is equal to 0.45 in the soft wind mode, and $$\frac{\omega_1}{\omega_2}$$

is equal to 0.95 in direct wino mode. Cooperating the gears with different speed, it can achieve multi-speed air outlet in soft wind mode and multi-speed air outlet in direct wind mode. The preset gears may also include the gear of the preset normal mode, $$\frac{\omega_1}{\omega_2}$$

is equal to 0.8. Under the premise of maintaining a large effective air supply distance, the airflow has a divergence angle and the wind feel is relatively moderate. In addition, the user can use the gear editor to customize gear settings, and the editable contents include a total output power and a speed ratio. After editing, the contents are saved in the memory and associated with the custom gear selection key to realize the direct call and selection of the custom air outlet mode.

It should be pointed out that when using flat blades, the steering adjustment device is used to change the steering of the motor, and the air outlet direction is opposite. The influence of the speed ratio $$\frac{\omega_1}{\omega_2}$$

or the first blade 201 and the second blade 301 on the air outlet effect is no longer directly applicable to the foregoing content, which need to be replaced with the speed ratio $$\frac{\omega_2}{\omega_1}$$

of the second blade 301 and the first blade 201. When using cambered blades, the steering adjustment device is used to change the steering of the motor, and the wind direction is opposite. However, the air outlet effect is different from when using flat blades. Except for the overall air output capacity is reduced, other aspects are basically in line with the above content.

Embodiments of the present disclosure, motors that rotate in opposite directions are used to drive the first blade 201 and the second blade 301 whose blades are twisted in opposite directions to drive the air out in the axial direction. The electronic control board controls the speed of the first motor 200 and the second motor 300 within a ratio range to adjust the fan's air outlet mode. For example, when the speed ratio $$\frac{\omega_1}{\omega_2}$$

of the first blade 201 and the second blade 301 is controlled within the range of [0.9, 1.0], the momentum of the air flow perpendicular to the axial direction of the motor can be cancelled each other, so that the air flow is more concentrated, the air volume is larger, and the air supply distance is longer, therefore, the speed of the first motor 200 and the second motor 300 can be reduced on the premise of meeting the requirement of a certain air supply distance, reducing the noise during the operation of the fan. However, when the electronic control boards controls the speed ratio $$\frac{\omega_1}{\omega_2}$$

of the first blade 201 and the second blade 301 within 0.55, the airflow can be dispersed more quickly to meet the air supply requirements of the soft wind mode for infants and the elderly. In addition, the speed ratio of the first motor 200 and the second motor 300 can also be adjusted through the speed ratio adjustment device of the electronic control board, so that the fan has the ability to quickly disperse the airflow, and the ability to emit the air at a long distance. The air outlet mode frequently used by users can be edited and stored through the editor that can edit gears and the memory. This mode is associated with the custom gear key as a custom gear, and after setting it, you can select with one key without repeating the setting every time you need to use it.

Except that the speed ratio of the two motors will affect the fan's air outlet effect, the value of a number $n_1$ of the first blade 201, a number $n_2$ of the second blade 301, a torsion angle $\theta_1$ of the first blade is, and a torsion angle $\theta_2$ of the second blade and the relationship between them will also have an impact on the air outlet effect. When many influencing factors jointly affect the fan's air output capacity and it is difficult to calculate in detail, how to combine the relationship of these influencing factors to achieve the optimal design will face theoretical and experimental difficulties.

For this, a product of a ratio of the number of the first blade 201 to the number of the second blade 301 and a ratio of the torsion angle of the first blade 201 to the torsion angle of the second blade 301 is a first difference coefficient between the first blade 201 and the second blade 301. A product of a ratio of the area of the first blade 201 to the length of the first blade 201 and a ratio of the area of the second blade 301 to the length of the second blade 301 is a second difference coefficient. The first difference coefficient $K_1$ is equal to $$\frac{n_1 \cdot \theta_1}{n_2 \cdot \theta_2},$$

and the second difference coefficient $K_2$ is equal to $$\frac{l_2 S_1}{l_1 S_2}.$$

When the shape, area, length, width and other conditions of the first blade 201 and the second blade 301 are constant, the first difference coefficient reflects the ratio of the air output capacity. When conditions such as the number of the first blade 201 and the second blade 301, the torsion angle of the blades, and the width of the blades are constant, the second difference coefficient reflects the ratio of the air output capacity.

When the constant total output power and other conditions of the blades are the same, a grouping test of the fan's air output capacity with different $k_1$ values is carried out, and the results are as follows:

|  | $k_1$ | | | | | | | | |
|---|---|---|---|---|---|---|---|---|---|
|  | 0.5 | 0.6 | 0.7 | 0.8 | 0.9 | 1.0 | 1.1 | 1.2 | 1.3 |
| air output (m³/h) | 522 | 705 | 850 | 950 | 986 | 988 | 970 | 945 | 830 |
| air supply distance (m) | 3.2 | 4.5 | 5.4 | 7.2 | 8.7 | 8.2 | 7.5 | 6.2 | 5.0 |

It can be seen from the above data that when $k_1$ is no less than 0.1 and no greater than 1.2, the air output and air supply distance of the fan can reach a better value range. The optimal interval of the air output and air supply distance is $k_1 \in [0.9, 1.1]$.

When the constant total output power and other conditions of the blades are the same, the grouping test of the fan's air output capacity with different $k_2$ values is carried out, and the results are as follows:

| | $k_2$ | | | | | | | | |
|---|---|---|---|---|---|---|---|---|---|
| | 0.6 | 0.7 | 0.8 | 0.9 | 1.0 | 1.1 | 1.2 | 1.3 | 1.4 |
| air output (m³/h) | 615 | 745 | 851 | 876 | 869 | 860 | 845 | 751 | 683 |
| air supply distance (m) | 4.2 | 5.0 | 6.2 | 7.7 | 7.4 | 7.0 | 6.2 | 5.5 | 4.8 |

It can be seen from the data that the optimal interval of the fan's air output and air supply distance is $k_2 \in [0.8, 1.2]$ In addition, the relationship between the length of the first blade 201, the length of the second blade 301, and the distance between the first blade 201 and the second blade 301 will also affect the air output capability of the fan.

The air output capacity of the fan of the present disclosure benefits from the combined effect of the relative rotation of the first blade 201 and the second blade 301 on the air flow. When the distance between the first blade 201 and the second blade 301 is too large, or the length of the first blade 201 and the length of the second blade 301 differ greatly, the combined effect of the two blades on the airflow will be weakened. Therefore, it is necessary to set the ratio of the length of the first blade 201 to the length of the second blade 301 within a certain interval, and set the ratio of the length of the first blade 201 to the distance between the first blade 201 and the second blade 301 within a certain interval.

In this regard, other influencing factors are fixed and a single variable comparison test is performed. The ratio of the length of the first blade 201 to the length of the second blade 301 affects the air output and the air supply distance. The data is as follows:

| | $l_1/l_2$ | | | | | | | | |
|---|---|---|---|---|---|---|---|---|---|
| | 0.6 | 0.7 | 0.8 | 0.9 | 1.0 | 1.1 | 1.2 | 1.3 | 1.4 |
| air output (m³/h) | 701 | 765 | 821 | 842 | 840 | 817 | 800 | 771 | 683 |
| air supply distance (m) | 3.6 | 4.7 | 5.6 | 6.9 | 7.0 | 6.4 | 5.2 | 4.9 | 3.2 |

The influence of the ratio of the length of the first blade 201 to the distance between the first blade 201 and the second blade 301 on the air output and the air supply distance is as follows:

| | $l_1/L$ | | | | | |
|---|---|---|---|---|---|---|
| | 1 | 1.5 | 2 | 2.5 | 3 | 3.5 |
| air output (m³/h) | 785 | 821 | 842 | 856 | 830 | 828 |
| air supply distance (m) | 6.7 | 7.4 | 8.2 | 7.7 | 7.6 | 7.0 |

From the above data, it can be concluded that the better value range of $$\frac{l_1}{L}$$

is [0.8, 1.3]. The better value range of $$\frac{l_1}{l_2}$$

is [1.5, 3]. The optimal value interval of $$\frac{l_1}{L}$$

is [0.9, 1.1], and the optimal value interval of $$\frac{l_1}{l_2}$$

is [2, 2.5].

There are many factors that affect the ability of the counter-rotating fan to discharge air, and the factors are related to a certain degree, which makes it difficult to determine the specific setting of the counter-rotating fan when the air is optimally discharged. Through a series of original comparative experiments, the better ratio between the influencing factors is obtained, and the ratio and value interval of the factors affecting the first blade 201 and the second blade 301 that affect the air outlet capacity of the counter-rotating fan are defined, so that the air outlet capacity of the counter-rotating fan is optimized.

The above-mentioned embodiment is a one embodiment of a fan using double blades. In order to further increase the air supply distance of the fan, the present disclosure also proposes another embodiment on the basis of double blades.

Figure 4:
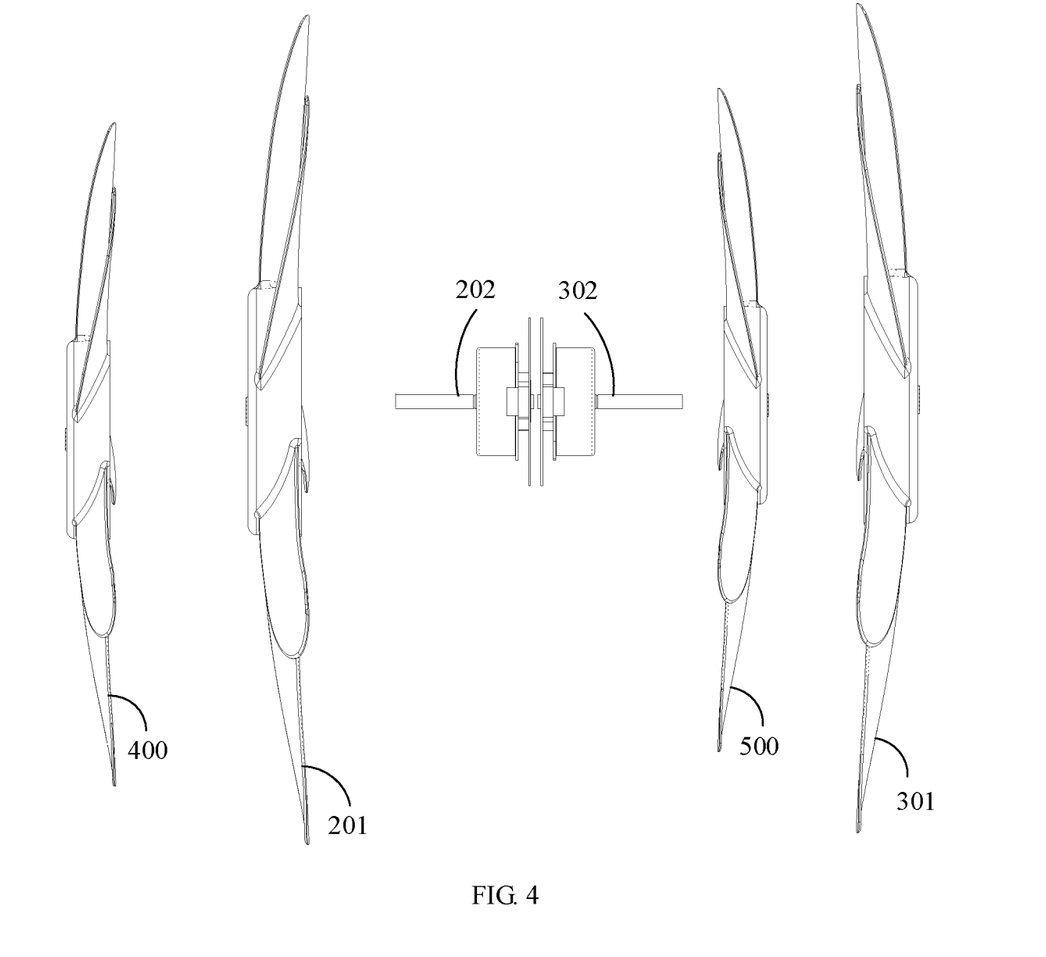
FIG. 4 is a schematic structural diagram of the blade and the motor of the fan according to another embodiment of the present disclosure.

As shown in FIG. 4, the fan in this embodiment further includes a third blade 400, and the addition of the third blade 400 can perform further rectification adjustment on the basis of the double blades to whirl the wind to increase the farthest air supply distance. In one embodiment, the third blade 400 is installed on the first rotation shaft 202. The third blade 400 is provided on the opposite side of the first blade 201 and the second blade 301. In addition, a length of the third blade 400 is smaller than the length of the first blade 201.

The blade changes the velocity and direction of the airflow. When two sets of blades are used, the airflow can be adjusted twice, and the two sets of blades can be set and adjusted to achieve the purpose of artificially adjusting the air outlet effect. Accordingly, the present disclosure proposes the embodiments of the above two sets of blades. However, when the airflow flows, it is obstructed by the surrounding air, so the boundary of the airflow has greater instability. The airflow can be divided into the center area of the airflow stream and the boundary area of the airflow stream. In contrast, the flow velocity in the center area of the air stream has a greater impact on the air supply distance, while the air stream boundary area has a greater impact on the air supply angle. Therefore, the present disclosure provides an embodiment of adding a rectifying blade on the basis of the above-mentioned double blades.

The third blade 400 is a rectifying blade, which is mainly used to adjust the proportion and flow velocity of the central area of the airflow beam. It has been achieved that under the condition of the same total power, the rectifying blade can obtain a longer air supply distance by adjusting the range and ratio of the central area and the boundary area of the airflow beam.

On this basis, in order to improve the stability of the fan during operation and further improve the rectifying capability of the rectifying blade, the present disclosure provides yet another embodiment. In this embodiment, the fan further includes a fourth blade 500, and the fourth blade 500 is installed on the second rotation shaft 302 and provided between the first blade 201 and the second blade 301. Similarly, a length of the fourth blade 500 is smaller than the length of the second blade 301. It should be pointed out that the rectifying blade can be the third blade 400 or the fourth blade 500 alone, or the third blade 400 and the fourth blade 500 can be provided at the same time.

The rectifying blade cooperates with the first blade 201 and the second blade 301 to make the airflow more adjustable. The rectifying blade additionally drives the airflow, and the additional driving action is concentrated in the central area of the air beam, and the area ratio and the flow rate ratio of the central area and the boundary area of the air beam generated by the fan can be adjusted, to obtain a longer air supply distance.

What is claimed is:

1. A fan, comprising:
   a support;
   a first motor installed on the support, the first motor having a first rotation shaft;
   a first impeller comprising first blades, the first impeller being installed on the first rotation shaft;
   a second motor installed on the support adjacent to the first motor, the second motor having a second rotation shaft coaxial with the first rotation shaft, wherein the second motor is configured to rotate in relative to rotation of the first motor;
   a second impeller comprising second blades, the second impeller being installed on the second rotation shaft, a tilt direction of each of the second blades being opposite to a tilt direction of each of the first blades;
   a third impeller comprising third blades, the third impeller being installed on the first rotation shaft outward of the first impeller in relative to the first motor, a length of each of the third blades being less than a length of each of the first blades; and
   a fourth impeller comprising fourth blades, the fourth impeller being installed on the second rotation shaft inward of the second impeller in relative to the second motor, a length of each of the fourth blades being less than a length of each of the second blades;
   wherein the first impeller is provided between the third impeller and the first motor, and the fourth impeller is provided between the second motor and the second impeller.

2. The fan of claim 1, wherein:
   a number of the first blades of the first impeller is $n_1$, and a number of the second blades of the second impeller is $n_2$;
   a torsion angle of each of the first blades is $\theta_1$, and a torsion angle of each of the second blades is $\theta_2$; and
   a first difference coefficient $K_1$ is $$\frac{n_1 \cdot \theta_1}{n_2 \cdot \theta_2},$$

and $K_1$ is between 0.7 to 1.2.

3. The fan of claim 2, wherein the first difference coefficient $K_1$ is between 0.9 to 1.1.

4. The fan of claim 2, wherein:
   a length of each of the first blades is $l_1$, an area of each of the first blades is $S_1$, a length of each of the second blades is $l_2$, and an area of each of the second blades is $S_2$;
   a second difference coefficient $K_2$ is $$\frac{l_2 S_1}{l_1 S_2},$$

and $K_2$ is between 0.8 to 1.2.

5. The fan of claim 4, wherein a ratio of $l_1$ to $l_2$ is between 0.8 to 1.3.

6. The fan of claim 5, wherein a distance between the first impeller and the second impeller is L and a ratio of $l_1$ to L is between 1.5 to 3.

7. The fan of claim 6, wherein the ratio of $l_1$ to $l_2$ is between 0.9 to 1.1, and the ratio of $l_1$ to L is between 2 to 2.5.

* * * * *